United States Patent [19]
Menlove

[11] Patent Number: 6,012,056
[45] Date of Patent: Jan. 4, 2000

[54] METHOD AND APPARATUS FOR ADJUSTING ONE OR MORE FACTORS USED TO RANK OBJECTS

[75] Inventor: Spencer Menlove, Los Alamos, N.Mex.

[73] Assignee: Cisco Technology, Inc., San Jose, Calif.

[21] Appl. No.: 09/025,708

[22] Filed: Feb. 18, 1998

[51] Int. Cl.[7] .................................................. G06F 17/30
[52] U.S. Cl. ..................... 707/5; 707/3; 707/6; 707/7; 707/516
[58] Field of Search .................... 707/3, 5, 6, 7, 707/516

[56] References Cited

U.S. PATENT DOCUMENTS

| | | | |
|---|---|---|---|
| 5,303,328 | 4/1994 | Masui et al. | 706/25 |
| 5,404,514 | 4/1995 | Kageneck et al. | 707/5 |
| 5,724,567 | 3/1998 | Rose et al. | 707/2 |
| 5,787,234 | 7/1998 | Molloy | 706/46 |
| 5,794,237 | 8/1998 | Gore, Jr. | 707/5 |
| 5,870,740 | 2/1999 | Rose et al. | 707/5 |

OTHER PUBLICATIONS

Soofi, E. S., et al., "Adjustment of importance weights in multiattribute", European Journal of Opertional Reseaarch, vol. 60, No. 1, Abstract only, Jul. 1992.

*Primary Examiner*—Jean R. Homere
*Attorney, Agent, or Firm*—Law Offices of Charles E. Gotlieb

[57] ABSTRACT

A method and apparatus modifies one or more weights or other numbers used to rank or score objects in order of predicted similarity to a target object. If the object most similar or identical to the target object is not ranked first, the weight or other number used to rank or score the objects is adjusted based on the objects ranked or scored higher than the most similar object, the object ranked or scored most similar to the target object, and the number of changes in direction, either positive or negative, of the current and prior adjustments to the weight or other number.

20 Claims, 4 Drawing Sheets

Microfiche Appendix Included
(3 Microfiche, 226 Pages)

METHOD AND APPARATUS FOR ADJUSTING ONE OR MORE FACTORS USED TO RANK OBJECTS

This application includes a Microfiche Appendix of 3 sheets and 226 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software that ranks objects from a set or group of objects.

BACKGROUND OF THE INVENTION

Many companies maintain computer databases containing descriptions of problems solved by customer engineers of the company. Each record or object of the database contains information about one of the problems that have been solved by persons who have worked for the company. This information may include a description of each problem in the database, as well as a description of the solution of that problem.

When a customer engineer wishes to use the computer database to solve a problem, the customer engineer enters a description of the problem that will allow the database to rank each solved problem stored in the database in the order of probability of matching the problem to be solved. For example, the solutions database for a company that sells computer networking products may contain 10 fields, which are used to enter a description of a problem. The first field may contain a description of the type of problem. The second field contains the description of the type of network. The third field contains a list of the model numbers of the one or more products that are either in the system that is not properly functioning, or themselves suspected of not functioning properly. The fourth field contains a list of software versions relevant to the problem. The fifth field contains a list of the interfaces pertinent to the problem. The sixth field contains a list of the protocols pertinent to the problem. The seventh field contains a list of the wide area networking protocols pertinent to the problem. The eighth field contains a textual description of the symptom of the problem. The ninth field contains a textual description of any error messages provided by any of the products in the third field. The 10th field contains a description of any interoperability issues.

To use the database to solve a problem, a customer engineer fills out as many of the above fields describing the problem as possible, and tells the database to locate solutions to similar problems. The database then ranks its stored, solved problems according to the similarity to the engineer's current problem. The database then displays titles and descriptions of the solved problems in rank order. The customer engineer can the review the solved problems and solutions in the order of similarity, select one, and apply it to the problem. If the application of the selected solution to the problem does not solve the problem, the customer engineer can continue scanning the solutions and continue selecting and applying solutions until the problem is solved or the customer engineer determines the solution to his problem is not in the database.

If the customer engineer determines that the solution to the problem is not in the database, the customer engineer may solve the problem without the use of the database. Once this solution is identified, the customer engineer may enter the description of the problem and its solution into the database so that subsequent similar problems may be more easily solved.

To rank each of the solved problems stored in the database, the database maintains a function and a weight for each of the ten fields described above. The function identifies field similarities between the problem to be solved and the solved problems stored in the database. For example, if one product is similar to another product, the function can identify the similarity between the product field of the problem to be solved to the product fields of the solved problems stored in the database. The function returns a similarity value for the field. The similarity values for all fields are programmed so that a perfect match between the field of the problem to be solved and any solved problem stored in the database produces a function result of a value of 1, and unrelated values produce a function result of less than 1, such as zero, although any range of values may be used. There is one such function for each field used to identify similarities.

Although each function uses the same 0–1 point scale, some fields may have more of an effect on the probability that a potential problem will match a solved problem stored in the database. To adjust for the differences in the effect of a match of a field, weights are assigned to each field. The weight of each field is determined using conventional knowledge engineering methods based on the importance of a match in that field to the solution of the problem. A field for which a match is more important to the solution of problems will have a higher weight than other fields for which a match is less likely to indicate the solution.

The function result for each field is multiplied by the weight of that field to produce an interim result. The interim results for each field of a solution stored in the database are added together to produce a score for each solution stored in the database.

The database may then sort the solutions stored in the database in descending order of the score of each solution. The database then displays the sorted solutions in sorted order along with the score. The customer engineer may then use the score and the order of the displayed solution to select a solution to apply to the problem.

It is possible that the actual solution to the problem is ranked below the first ranked solution, indicating that the scoring mechanism could be improved. When this situation occurs, there is presently no feedback mechanism to allow the database system to adjust the manner in which the solutions stored in the database are scored so that the actual solution can receive a higher score in the event that the identical problem is subsequently encountered. Therefore, a system and method are needed which can modify the manner in which the solutions stored by the database are ranked based on the rank of an actual solution relative to solutions the system identified as most similar.

SUMMARY OF INVENTION

A method and apparatus uses the rank of the actual solution to adjust one or more weights used to rank the solutions. If a user identifies an actual solution as one of the solutions presented, the method and apparatus identifies whether the actual solution was ranked first. If the actual solution was not ranked first, the weights are adjusted once for each solution ranked higher than the actual solution. The adjustment is performed by calculating the difference between each interim result of the actual solution and each interim result for the highest ranked solution stored in the database. The weight corresponding to each interim result is then adjusted by a fraction of this difference, divided by a number of times the difference changes direction from a prior difference, described below. The adjustment is repeated for each of the other solutions ranked higher than the actual solution. A counter which holds the number of times the difference changes direction from a prior difference is increased every time the sign of the difference changes from the difference computed for a different solution ranked higher than the actual solution, reducing the effect of changes to the weights that fluctuate in sign among the solutions ranked higher than the actual solution. The effect of the change in weight is to nudge the weights in the direction, which would have allowed the actual solution to be ranked first. Other embodiments change the numbers computed in the function itself, using a similar technique.

DETAILED DESCRIPTION OF A PREFERRED EMBODIMENT

Figure 1:
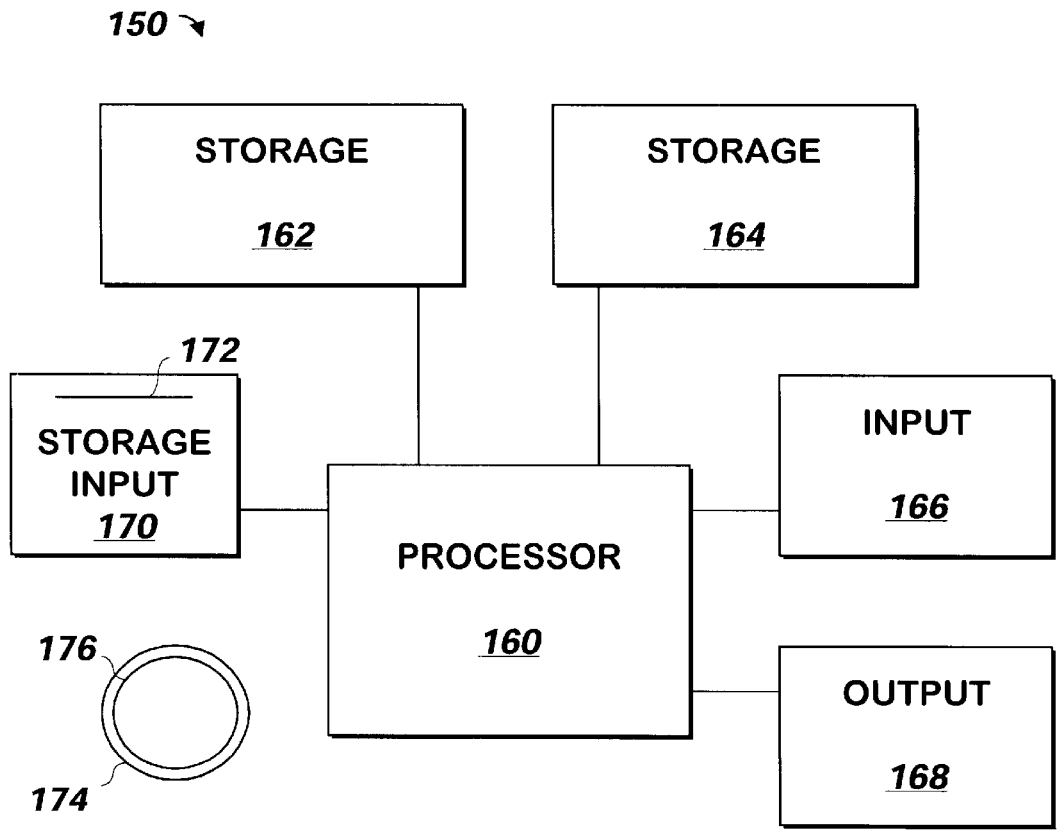
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM-compatible computer running the Windows 95 operating system commercially available from Microsoft Corporation of Redmond, Wash., although other systems may be used.

The following terms are used herein. A "target" is the problem to be solved. Solutions to problems stored in the database are referred to as "cases". If a case actually solves the target, it is referred to as the "real answer".

In one embodiment, the database system described above is modified as described herein to implement one embodiment of the present invention, however, the present invention applies to any case-based system.

Figure 2A:
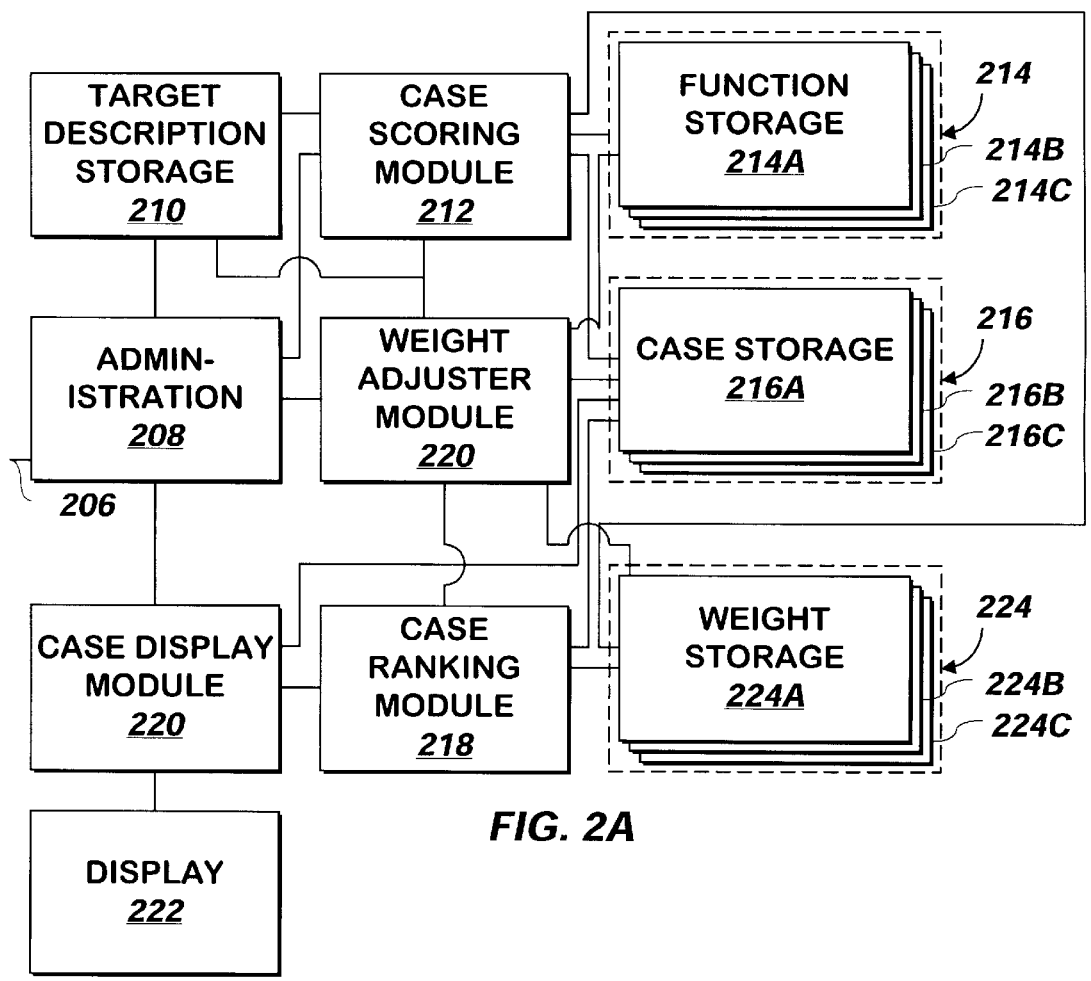
FIG. 2A is a block schematic diagram of an apparatus used to modify weights used to rank the predicted similarity of cases to a target based on the rank of a real answer according to one embodiment of the present invention.

Referring now to FIG. 2A, an apparatus for adjusting weight used to rank multiple cases based on the rank of a real answer is shown according to one embodiment of the present invention. Administration 208 receives via input 206 a description of the target, and stores this description in target description storage 210. The description of the target may include the ten fields described above, as well as other fields used to identify and track the target, such as a title, ID, status and author. Administration 208 signals case scoring module 212, which selects the cases stored in case storage 216 one at a time, and applies the functions stored in function storage 214 to the target description stored in target description storage 210 and the case selected in order to provide a function result that indicates the similarity of a field in the target to the corresponding field in the selected case.

There is one case function result for each function stored in function storage 214 for the selected case stored in case storage 216. Case scoring module 212 next multiplies each of the case function results by the corresponding weight stored in weight storage 224 to produce one interim result per function for the selected case, and sums each of the results for each case to produce a score for that case. Case scoring module 212 stores the score of each case 216A, 216B, 216C with the case in case storage 216. In one embodiment, case scoring module 212 also stores each of the interim results with the corresponding case for use as described below. Case scoring module 212 selects a different case and repeats the procedure described above. Case scoring module 212 signals administration 208 that case storage 216 contains the scores.

As described above, each of the fields used to calculate the score of a case has a corresponding function stored in function storage 214 and a corresponding weight stored in weight storage 224. As shown in the Figure, function storage 214 contains three functions 214A, 214B, 214C. Similarly, weight storage 224 contains three weights, 224A, 224B, 224C. However, other numbers of functions and weights can also be used. For example, 10 functions and weights may be used for the 10 fields described above.

Administration 208 signals case display module 220 to display the cases stored in case storage 216. Case display module 220 signals case ranking module 218, which generates an index for each case stored in case storage 216 that uniquely identifies each case in descending order of the score for that case. After it ranks each case, case ranking module 218 signals case display module 220, which retrieves the cases from case storage 216 in the order of the index generated by, and stored in, case ranking module 218. Case display module 220 displays a subset (for example, fifty) of the highest ranked cases in rank order along with the score for the case and rank order number on display 222, which is a conventional computer display such as a conventional computer monitor.

The user may then apply the cases displayed in an attempt to solve the target problem. If one of the cases displayed solves the target problem, the user will indicate the case which solved the problem, known as the "real answer". For example, this identifier may be the rank order number of the case.

Administration 208 receives via input 206, coupled to a conventional input device such as a conventional keyboard and mouse (not shown), an identifier of the case corresponding to the real answer. Administration 208 sends this identifier, or an identifier such as a database record number or index corresponding to the real answer to weight adjuster module 220, which adjusts the weights stored in weight storage 224 as described below.

Figure 2B:
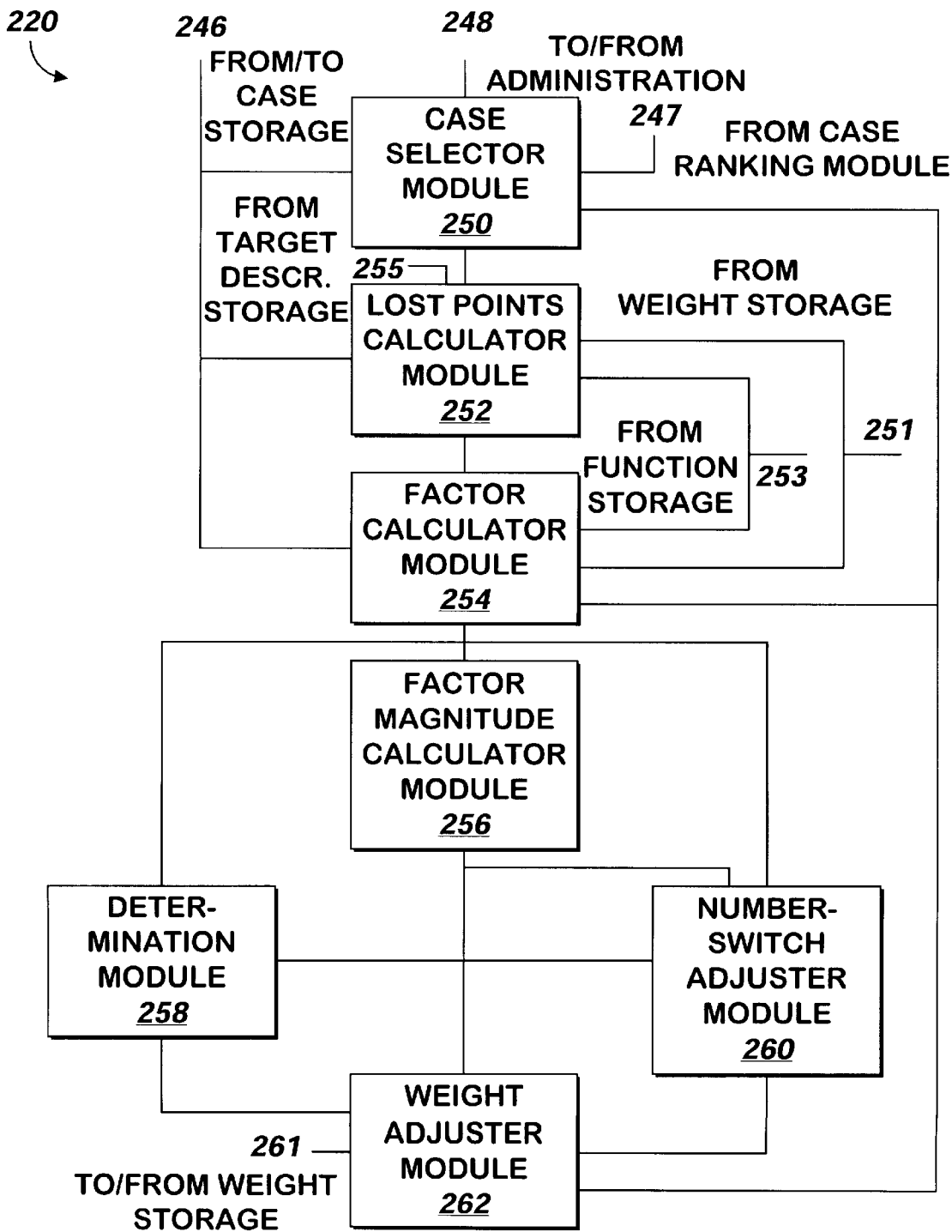
FIG. 2B is a block schematic diagram of a weight adjuster module of FIG. 2A according to one embodiment of the present invention.

Referring now to FIG. 2B, the weight adjuster module 220 of FIG. 2A is shown according to one embodiment of the present invention. Case selector module 250 receives at input/output 248 an identifier of the real answer. Case selector module 250 uses this identifier and the index stored in case ranking module 250 coupled via input 247 to identify the rank of the real answer. In another embodiment, the rank of the real answer is received at input 248 and input 247 is not used.

If the rank of the real answer is equal to one at input/output 246, case selector module 250 signals administration via input output 248 that the operation is complete. In such event, no weight adjustment is performed. If the rank of the real answer is greater than one, case selector module 250 selects the case having a rank equal to one, and signals lost points calculator module 252 by transmitting an identifier of the selected case and the real answer. Lost points calculator module 252 calculates the interim results for each field of the selected case by transmitting the fields of the selected case and the target received at input 255 to the corresponding function via input/output 253 and receiving a vector of the function results. Lost points calculator module 252 retrieves the weights from weight storage via input/output 253 and stores these weights until all weight adjustments for a given real answer are complete. A vector of lost points is calculated by multiplying the result of the field function for the case by the field weight. In one embodiment, the lost points for each field of each case are computed by case ranking module 218 of FIG. 2A and stored with the case in case storage 216 as the interim results. In such embodiment, lost points calculator module 252 simply retrieves the interim results from case storage 216 of FIG. 2A and places them into a single vector of lost points. Otherwise, lost points calculator module calculates the lost points by re-applying the functions and the weights available at inputs 253, 251, respectively to produce a vector of lost points, each element in the vector comprising a function result multiplied by the corresponding weight. Lost points calculator module 252 then passes the lost points vector and the identifier of the real answer received from case selector module 250 to factor calculator module 254.

Factor calculator module 254 calculates the lost points for the real answer identified by case selector module 250. Factor calculator module 254 subtracts each element of the lost points vector for the real answer from the corresponding element of the lost points for the selected case. The result of this subtraction, known as a factor, is a vector, with one value for each of the fields corresponding to a function and a weight. Factor calculator module 254 transmits the factor vector to factor magnitude calculator module 256. In one embodiment, the lost points for the real answer are calculated by factor calculator module 254 only once per real answer selected, and not once for every case ranked higher than the real answer.

Factor magnitude calculator module 256 then calculates the absolute value of each element of the factor vector, for example by multiplying by −1 any elements of the vector which have a value less than zero. The result is the Factor Magnitude vector.

In one embodiment, any change made by weight adjuster module 220 to any of the weights stored in weight storage 224 of FIG. 2A is a function of not only the magnitude calculated by factor magnitude calculator module 256, but also the number of times the sign of the factor calculated by factor calculator module 254 has changed. Determination module 258 determines whether the sign of each element of the factor calculated by factor calculator module 254 is opposite from the sign of the corresponding element of the prior factor. When this occurs, the upcoming change to the weight will be in a different direction from the prior change to the weight (e.g. increase weight, then reduce weight, or reduce weight, then increase weight).

Information regarding the sign of the prior factor is maintained in a vector referred to as NumberSwitch. NumberSwitch contains one element for each weight, each element initialized to a value of 0 for each real answer selected, and is updated as described below. Determination module 258 makes its determination by multiplying each element in the factor calculated by factor calculator module 254 by the corresponding element in NumberSwitch, received from numberswitch adjuster module 260, described below. Determination module 258 passes the resulting vector to NumberSwitch adjuster module 260.

NumberSwitch adjuster module 260 adjusts the NumberSwitch vector as follows: each element of the NumberSwitch vector corresponding to an element in the result received from determination module 258 having a negative value is replaced by the value (factor/factormagnitude−numberswitch), where factor is the corresponding element in the factor vector calculated by factor calculator module 254, factormagnitude is the corresponding element of the factor magnitude calculated by factor magnitude calculator module 256, and numberswitch is the value of the corresponding element of the NumberSwitch vector (prior to the replacement). The other elements of the NumberSwitch vector are left unchanged.

Weight adjuster module 262 adjusts the weight vector received at input 261 from weight storage 224 of FIG. 2A. Weight adjuster module adjusts each element of the weight vector by adding to each element the corresponding values of (factormagnitude * weightgainfactor/numberswitch), where factormagnitude is the corresponding element of the FactorMagnitude vector received from factor magnitude calculator module 256, numberswitch is the corresponding element of the NumberSwitch vector received from NumberSwitch adjuster module 260, and weightgainfactor is a value stored in weight adjuster module 262 designed to moderate the adjustment to the weight vector. In one embodiment, weightgainfactor has a value equal to 0.1.

Weight adjuster module 262 signals case selector module 250 that the weight has been adjusted for the selected case. If the case following the previously selected case has a higher rank then the real answer, case selector module 250 selects the case ranked after the case presently selected, and the apparatus shown in FIG. 2B repeats the process described above for this selected case.

Figure 3:
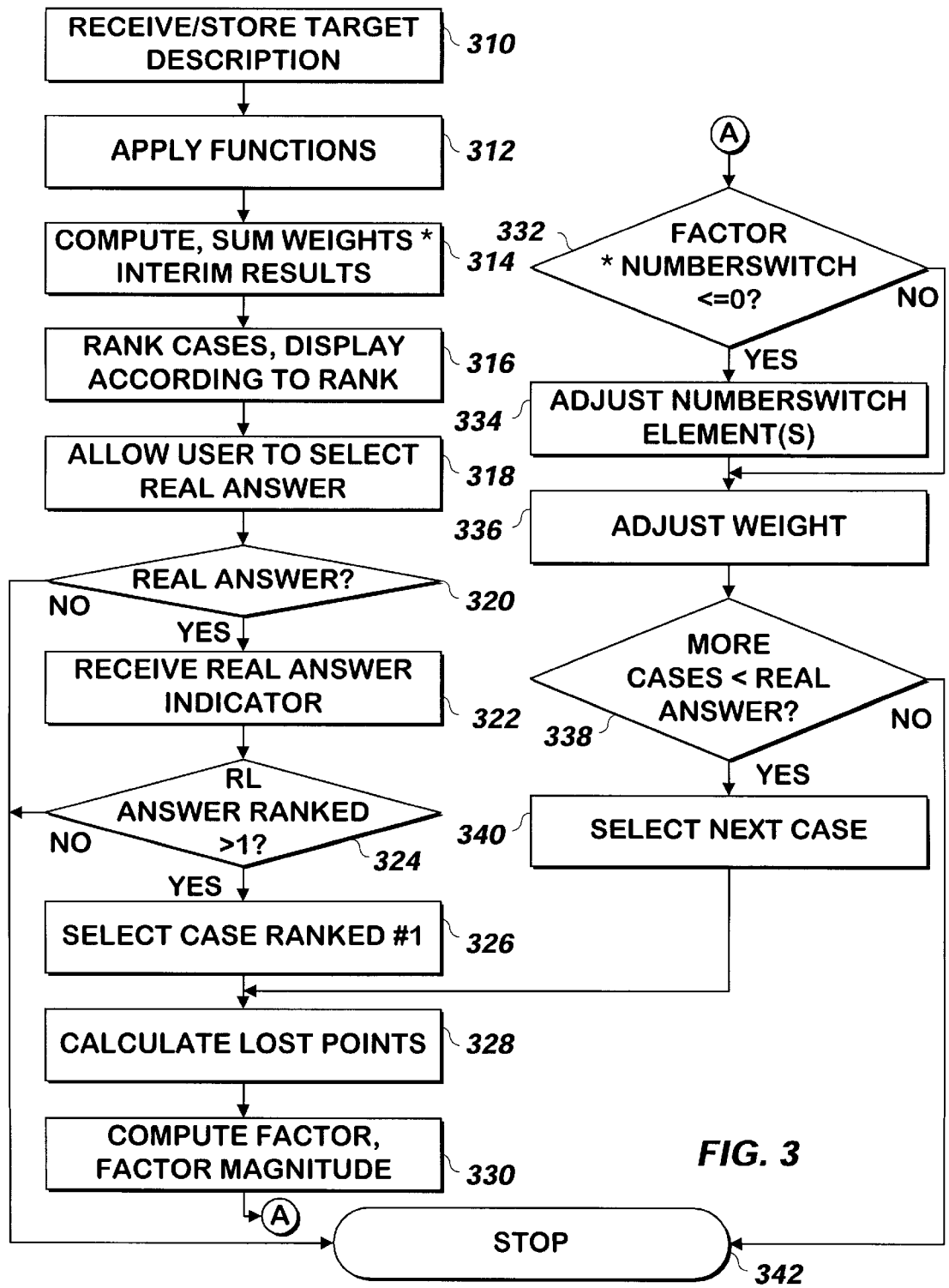
FIG. 3 is a flowchart illustrating a method of modifying weights used to rank the predicted similarity of cases to a target based on the rank of a real answer according to one embodiment of the present invention.

Referring now to FIG. 3, a method of adjusting weights used to rank cases based upon the rank of a real answer is shown according to one embodiment of the present invention. The target description, including the ten fields described above, is received and optionally stored 310. The functions described above are applied 312 to the target description and each case to produce a function result vector for each case, with one element per function.

Each of the function results in the function result vector is multiplied by the corresponding weight to produce 314 an interim result. Each interim result corresponding to a case is summed to produce a score for that case 314. The cases may be ranked in descending order of the case score, and displayed in rank order 316.

The user is allowed to select a real answer from the cases displayed 318. If no real answer exists from among the cases 320, the method stops at step 342. If the real answer is selected by a user, for example by providing an indicator corresponding to the real answer, the indicator is received 322. If the real answer was ranked first among all of the cases 324, the method terminates at step 342, and no further adjustments resulting from the solution to the target description received at step 310 are made. If the real answer was ranked other than first 324, the method continues at step 326.

The lost points vector is computed 326 for the real answer as described above, or it may be retrieved if it was stored with the real answer when calculating the rank and score of the real answer as described above. Additionally, one of the cases ranked higher than the real answer is selected 326. For example, the case initially selected may be the case ranked first, that is, the case having the highest score.

The lost points vector is calculated for the selected case as described above 328 or retrieved if they were stored as a part of step 314. The factor and factor magnitude vectors are also computed for the selected case as described above 330.

If the product of any element of the factor vector and the corresponding element of the number switch vector described above is less than or equal to zero 332, the corresponding element of NumberSwitch is adjusted as described above 334, and the other elements of number-switch are left unchanged. The weight vector is then adjusted as described above 336. If no additional cases are ranked higher than the real answer 338, the method terminates at step 342. Otherwise, another case ranked higher than the real answer and not already selected is selected 340, and the method continues at step 328. In one embodiment, the next case selected in step 340 is the case ranked immediately after the prior selected case.

Exhibit A, attached hereto, contains a list of the possible values for 7 selected fields of the ten fields described above in a system according to one embodiment of the present invention . The number to the left of the value indicates the generation of the value: values with a '2' are children of the value with a '1' immediately above it. The source code for one embodiment of the present invention is listed in Exhibit B, illustrating one embodiment of the present invention as applied to computer networking products commercially available from Cisco Systems, Inc. of San Jose, Calif. The functions to be applied to the various fields are contained in the source code. A datafile which describes words to ignore and equivalent words is listed in Exhibit C.

Although the present invention is described above with the score responsive to a single function multiplied by a single weight, a larger number of weights can be used. In one embodiment, the score for each case is the sum of a product of the function result vector, a first weight vector and a second weight vector, with the second weight vector computed responsive to the function result vector. Such an arrangement would allow for cross effects. For example, the second weight vector has a default value for all elements equal to a value of 1, except that element number 1 of the second weight vector has a calculated value of 0.5 if function results 2 and 5 were higher than a threshold value, reducing the effect of function number 1 in that circumstance. The calculated values of the second weight vector would be adjusted as described above based on the rank of the real answer and whether the calculated values of the second weight vector were used to score the case that ranked higher than the real answer.

In another embodiment, weights are not adjusted, and the function calculations are adjusted instead of the weights based upon the rank of the real answer. In such embodiment, the functions are adjusted in such a manner that the resulting score would be the same as the score in the embodiment described above which uses weights, but only for the values of the fields contained in the target and each individual case.

Assume for example, if the real answer, ranked second, had a product field equal to "model 0001", and the highest ranked case had a product field equal to "model 0002". Assume the target had a product field of "model 0003". The function result for a target having a product field of "model 0003" and a case having a product field of 0002 could be reduced, the function result for a target having a product field of "model 0003" and a case having a product field equal to "model 0001" could be raised, or both, by weight vector adjuster module 262 of FIG. 2B or by step 336 of FIG. 3, either in addition to, or in place of, adjusting the weight as described above. In one such embodiment, the function resolves each combination of the value of the target and the selected case to an index of an array containing the function result value. In such embodiment, the value can be adjusted in the array by the same amount as described above so that, as to the specific combination of target field and case field, the new function result will point to a value that is adjusted by the same amount as described above. This embodiment will leave unchanged function results for cases having a product field equal to model 0004, for example, until such case is ranked higher than the real answer.

Although the present invention has been described above with reference to a help-desk application, the present invention may be applied to any application in which case-based reasoning is used to identify similarities between a target and multiple cases.

What is claimed is:

1. An apparatus for adjusting at least one number used to produce at least one predicted similarity score indicative of a predicted similarity between a first object and each of a plurality of second objects, the apparatus comprising:

a scoring module having a first input operatively coupled to receive at least one of the at least one number, a second input operatively coupled to receive at least one second object, and a third input operatively coupled to receive at least a portion of the first object, the scoring module for generating and providing at a scoring module output the at least one predicted similarity score, each predicted similarity score generated responsive to at least one of the at least one number received at the first scoring module input, at least one second object received at the second scoring module input, and the first object received at the third scoring module input; and an adjuster module having a first input operatively coupled to receive an indicator of at least one selected second object, a second input operatively coupled to receive at least one of the at least one number, a third input coupled to the scoring module output for receiving at least one indicator of the predicted similarity scores of at least one second object including the second object corresponding to the indicator received at the first adjuster module input, the adjuster module for adjusting and providing at an output at least one of the at least one number responsive to a score of the second object corresponding to the indicator first input not higher than a score of at least one other second object.

2. The apparatus of claim 1 additionally comprising:

a first storage having an input operatively coupled to receive the at least one number, the first storage for storing, and providing at a first storage output coupled to the scoring module first input and the adjuster module second input, the at least one first number received at said first storage input;

an administration having a input operatively coupled to receive a description of the first object and an indicator of the selected second object, and an output coupled to the adjuster module first input and the scoring module third input for providing the description received at the administration input and for providing an indicator corresponding to the indicator of the second selected object received at the administration first input; and a case storage for storing the second objects and providing at an output coupled to the scoring module second input at least a portion of the second objects.

3. The apparatus of claim 2 additionally comprising:

a case ranking module having an input coupled to the case scoring module output for receiving at least one of the predicted similarity scores, the case ranking module for assigning a rank to each of a plurality of the second objects responsive to the predicted similarity score of said each second object and providing said rank at an output; and a case display module having a first input coupled to the case ranking module output for receiving a plurality of the ranks and a second input coupled to the case storage output for receiving at least a portion of a plurality of the second objects, the case display module for providing at a display output each of a plurality of the second objects in an order responsive to the rank of the second object.

4. The apparatus of claim 1, wherein the at least one number comprises at least one weight.

5. The apparatus of claim 1, wherein the at least one number comprises at least one function.

6. The apparatus of claim 1, wherein the adjuster module adjusts each of at least one of the at least one number additionally responsive to a number of changes in direction of at least one prior adjustment to said at least one number.

7. A method of modifying at least one first number used to identify similarities between a first object and each of a plurality of second objects, the method comprising:

receiving a description of the first object;

generating a predicted similarity score of each of the plurality of second objects responsive to at least one of the at least one first number, at least a portion of the first record received and at least a portion of said each of the plurality of second objects, the predicted similarity score corresponding to a predicted similarity of said each of the plurality of second objects to the first object;

receiving an identifier of at least one of the second objects most similar to the first object; and modifying at least one of the at least one first number responsive to the identifier received.

8. The method of claim 7, wherein the predicted similarity score is additionally responsive to a result of at least one function.

9. The method of claim 7, wherein the predicted similarity score comprises at least one function result; and at least one of the at least one first number is used to generate at least one of the at least one function result.

10. The method of claim 7, comprising the additional steps of:

computing an order of each of the second objects responsive to the predicted similarity score of the second object; and displaying a plurality of the second objects responsive to the order computed.

11. The method of claim 7 wherein, for each of at least one of the first numbers, the modifying step is additionally responsive to a second number of changes in direction of adjustments to the number.

12. The method of claim 11, wherein the modifying step is additionally responsive to a constant value.

13. The method of claim 7, wherein each of the first object and the plurality of second objects comprises at least one field, and the modifying step comprises:

applying a function to at least one field of the second object different from the second object corresponding to the identifier received and to the first object to produce a first function result;

applying the function to at least one field of the second object corresponding to the identifier received and to the first object to produce a second function result; and computing a difference between a second number responsive to the first function result and a third number responsive to the second function result.

14. A computer program product comprising a computer useable medium having computer readable program code embodied therein for modifying at least one first number used to identify similarities between a first object and each of a plurality of second objects, the computer program product comprising:

computer readable program code devices configured to cause a computer to receive a description of the first object;

computer readable program code devices configured to cause a computer to generate a predicted similarity score of each of the plurality of second objects responsive to at least one of the at least one first number, at least a portion of the first record received and at least a portion of said each of the plurality of second objects, the predicted similarity score corresponding to a predicted similarity of said each of the plurality of second objects to the first object;

computer readable program code devices configured to cause a computer to receive an identifier of at least one of the second objects most similar to the first object; and computer readable program code devices configured to cause a computer to modify at least one of the at least one first number responsive to the identifier received.

15. The computer program product of claim 14, wherein the predicted similarity score is additionally responsive to a result of at least one function.

16. The computer program product of claim 14, wherein the predicted similarity score comprises at least one function result; and at least one of the at least one first number is used to generate at least one of the at least one function result.

17. The computer program product of claim 14, additionally comprising:

computer readable program code devices configured to cause a computer to compute an order of each of the second objects responsive to the predicted similarity score of the second object; and computer readable program code devices configured to cause a computer to display a plurality of the second objects responsive to the order computed.

18. The computer program product of claim 14 wherein, for each of at least one of the first numbers, the computer readable program code devices configured to cause a computer to modify are additionally responsive to a second number of changes in direction of adjustments to the number.

19. The computer program product of claim 18, wherein the computer readable program code devices configured to cause a computer to modify are additionally responsive to a constant value.

20. The computer program product of claim 14, wherein each of the first object and the plurality of second objects comprises at least one field, and the computer readable program code devices configured to cause a computer to modify comprise:

computer readable program code devices configured to cause a computer to apply a function to at least one field of the second object different from the second object corresponding to the identifier received and to the first object to produce a first function result;

computer readable program code devices configured to cause a computer to apply the function to at least one field of the second object corresponding to the identifier received and to the first object to produce a second function result; and computer readable program code devices configured to cause a computer to compute a difference between a second number responsive to the first function result and a third number responsive to the second function result.

* * * * *